(12) United States Patent
Hockenstrom et al.

(10) Patent No.: US 9,527,391 B2
(45) Date of Patent: Dec. 27, 2016

(54) METHOD FOR CONTROLLING CHARGING OF A HYBRID OR ELECTRIC VEHICLE

(71) Applicant: VOLVO CAR CORPORATION, Gothenburg (SE)

(72) Inventors: Anders Hockenstrom, Gothenburg (SE); Per Torstensson, Varberg (SE); Martin Hadartz, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 329 days.

(21) Appl. No.: 14/464,017

(22) Filed: Aug. 20, 2014

(65) Prior Publication Data

US 2015/0061594 A1    Mar. 5, 2015

(30) Foreign Application Priority Data

Sep. 2, 2013    (EP) ..................... 13182650

(51) Int. Cl.
*H02J 7/00* (2006.01)
*B60L 11/18* (2006.01)
*B60L 8/00* (2006.01)
*H01R 13/639* (2006.01)
*B60L 3/00* (2006.01)

(52) U.S. Cl.
CPC .......... *B60L 11/1812* (2013.01); *B60L 3/0069* (2013.01); *B60L 8/006* (2013.01); *B60L 11/1805* (2013.01); *B60L 11/1816* (2013.01); *B60L 11/1838* (2013.01); *H01R 13/639* (2013.01); *B60L 2210/30* (2013.01); *B60L 2240/36* (2013.01); *B60L 2240/80* (2013.01); *B60L 2270/32* (2013.01); *B60L 2270/34* (2013.01); *G07C 2209/08* (2013.01); *Y02T 10/705* (2013.01); *Y02T 10/7005* (2013.01); *Y02T 10/7072* (2013.01); *Y02T 10/7083* (2013.01); *Y02T 90/14* (2013.01)

(58) Field of Classification Search
USPC ........................................................ 320/109
See application file for complete search history.

(56) References Cited

U.S. PATENT DOCUMENTS 5,385,480 A  *  1/1995  Hoffman ............. B60L 11/1818
                                                          439/138
8,262,402 B2     9/2012  Gaul et al.
(Continued)

FOREIGN PATENT DOCUMENTS

| EP | 2535218 | 12/2012 |
| WO | 2010115927 | 10/2010 |
| WO | 2011006775 | 1/2011 |

OTHER PUBLICATIONS

Extended European Search Report for EP 13182650.5, Completed by the European Patent Office, Dated Feb. 27, 2014, 7 Pages.
(Continued)

*Primary Examiner* — Brian Ngo
(74) *Attorney, Agent, or Firm* — Brooks Kushman P.C.

(57) ABSTRACT

A method and system are provided for controlling a lock state of a charging cable connected to a power inlet of an electrical vehicle. The vehicle includes an energy storage device electrically connected to the power inlet, a lock unit for locking the charging cable to the power inlet, and a control unit for controlling a lock state of the lock unit.

20 Claims, 3 Drawing Sheets

(56) References Cited

U.S. PATENT DOCUMENTS

| | | | | |
|---|---|---|---|---|
| 2009/0082916 | A1* | 3/2009 | Tanaka | B60K 6/48 |
| | | | | 701/22 |
| 2010/0079105 | A1* | 4/2010 | Iwanaga | B60K 6/445 |
| | | | | 320/109 |
| 2011/0287649 | A1* | 11/2011 | Kurumizawa | B60L 11/1818 |
| | | | | 439/304 |
| 2011/0300733 | A1* | 12/2011 | Janarthanam | B60L 11/1818 |
| | | | | 439/304 |
| 2011/0300736 | A1* | 12/2011 | Katagiri | B60L 11/14 |
| | | | | 439/347 |
| 2011/0300753 | A1* | 12/2011 | Ichikawa | B60L 3/0069 |
| | | | | 439/620.21 |
| 2012/0088382 | A1* | 4/2012 | Konchan | B60L 11/1818 |
| | | | | 439/153 |
| 2012/0112697 | A1* | 5/2012 | Heuer | B60L 11/1818 |
| | | | | 320/109 |
| 2012/0143401 | A1* | 6/2012 | Jayadevappa | B62H 3/00 |
| | | | | 701/2 |
| 2012/0313580 | A1* | 12/2012 | Charnesky | B60L 11/1818 |
| | | | | 320/109 |
| 2013/0078840 | A1* | 3/2013 | Inoue | B60L 11/1818 |
| | | | | 439/345 |

OTHER PUBLICATIONS

Website http://eds.volvocars.com/site/owners-information/MY09/V50/PDF/V50_quick_guide_my09_de_tp10274.pdf Volvo V50 Quick Guide Web Edition, English translation attached to original reference in German, English Translation retrieved on Aug. 20, 2014, All together 16 Pages, "Welcome to your new volvo!".

* cited by examiner

METHOD FOR CONTROLLING CHARGING OF A HYBRID OR ELECTRIC VEHICLE

CROSS-REFERENCE TO RELATED APPLICATIONS

This application claims foreign priority benefits under 35 U.S.C. §119(a)-(d) to European patent application number EP 13182650.5, filed Sep. 2, 2013, which is incorporated by reference in its entirety.

TECHNICAL FIELD

The present disclosure relates to a connection between a power supply and an electric or hybrid vehicle. In particular, the present disclosure relates to the operational state of such a connection.

BACKGROUND

Electric and hybrid vehicles have recently become a more common sight on roads worldwide. They have one thing in common and that is they all require a large and powerful rechargeable battery. Despite the size of such batteries mounted in e.g. electric vehicles, they need to be recharged almost every day, depending on how frequently and how far the vehicle is driven. In a hybrid vehicle, the battery may be charged directly by an internal combustion engine, or it may be charged by an external power supply such as in a plug-in hybrid vehicle.

The power required from a power source in order to charge a rechargeable battery of an electric vehicle is substantial. Due to the high powers, the cables and connectors of the charging system need to be robust and be able to handle the high powers in a reliable way. Furthermore, since an electrical charging current is substantial it is important to protect a user from contact with connectors of the cable to avoid injuries which may be caused by the high currents. Typically, the charging cable is locked and secured to the vehicle when charging. Locking the cable to the vehicle therefore prevents hazardous disconnection of the cable by a user during charging and also prevents theft of the cable. Furthermore, to prevent damages on the vehicle or a charging station, the cable should not be possible to connect to a running vehicle.

A charging system for electrical or hybrid vehicles is for example disclosed by U.S. Pat. No. 8,311,690. The disclosed charging system prevents theft of a charging cable, insertion of foreign objects into a vehicle receptacle, or tampering of the charging cable when the battery is being charged. The charging cable may be locked to the receptacle of a power inlet in the vehicle. The locking and unlocking of the charging cable to the power inlet is interconnected with locking and unlocking, respectively, of the vehicle doors.

However, such a system for example restricts the availability of the vehicle to a user during charging. Thus, it would be desirable to have a more flexible charging system.

SUMMARY

In view of the abovementioned desired properties of a charging system, it is a general object of the present disclosure to provide a method for charging and a charging system that allow for improved safety and flexibility when charging an electrical or hybrid vehicle.

According to a first aspect of the disclosure it is therefore provided a method for controlling a lock state of a charging cable connected to a power inlet of an electrical vehicle, the vehicle comprising an energy storage device electrically connected to the power inlet, a lock unit for locking the charging cable to the power inlet, and a control unit for controlling a lock state of the lock unit, wherein the method comprises the steps of: in the control unit, receiving an unlock request for unlocking a charging cable locked to the power inlet by the lock unit; breaking an electrical connection between the charging cable and the energy storage device such that charging is aborted; unlocking the cable from the power inlet within a first predetermined time after receiving the unlock request; and, if the cable is not removed from the power inlet within a second predetermined time after receiving the unlock request, locking the cable to the power inlet and forming an electrical connection between the charging cable and the energy storage device to restart charging.

A lock state is an indication of whether the charging cable is locked to the power inlet by the lock unit of the vehicle or not. Two possible lock states are "locked" and "unlocked". The power inlet is arranged such that electrical energy may be transferred from a power supply, via the cable and the power inlet to the energy storage device in the vehicle. During charging of the energy storage device a user may submit a request to unlock the charging cable from the power inlet. The request is received by the control unit which controls the locking and unlocking of the charging cable from the power inlet. The control unit further controls aborting or pausing of charging of the energy storage device. The lock unit may be a locking pin or another type of arrangement that ensures that a plug of the cable is mechanically locked to the power inlet by the lock unit at all times during charging of the energy storage device. The lock unit prevents the charging cable from being removed from the power inlet when the lock unit is locked. The lock unit further prevents unknown objects to be inserted into the power inlet. Within a predetermined time after an unlock request is received means before the predetermined time has lapsed starting from when the unlock request is received by the control unit. The first predetermined time is shorter than the second predetermined time. Thus, first an unlock request is received to unlock the cable from the power inlet. Within the first predetermined time after the unlock request is received, the cable is unlocked from the power inlet by the control unit. However, if the cable is not removed, thus not disconnected, from the power inlet of the vehicle within the second predetermined time, being longer than the first predetermined time, the cable is locked to the power inlet and charging may be restarted. The second predetermined time is sufficiently long for a user to remove the cable from the power inlet of the vehicle. The first predetermined time is such that charging is aborted before the first predetermined time has lapsed, in other words, at the time when the cable is unlocked from the power inlet of the vehicle, charging has already been aborted.

The present disclosure is based on the realization that a charging sequence for charging of an energy storage device of a vehicle may be integrated with a locking functionality of a charging cable to a power inlet of the vehicle. The disclosure is further based on the realization that the charging cable should be unlocked within a predetermined time after the unlock request has been received by a control unit. Safety during a charging sequence is improved because it is not possible to remove the cable within the first predetermined time during which charging is stopped, thus preventing the plug of the cable with high currents to be exposed to a user. Furthermore, safety can be increased because charging is only allowed when the cable is locked to the power inlet by the lock unit, and further, charging is aborted if the cable is unlocked from the power inlet by the lock unit. The disclosure may further improve the charging sequence in a way that the charging sequence may be continued or resumed even if an unlock request is unintentionally sent. Such improvement of the charging sequence is enabled by relocking the cable to the power inlet if the cable is not removed within the second predetermined time. The charging may then be continued after the cable is locked to the power inlet.

According to one embodiment of the disclosure, the method may further comprise a step of locking the cable to the power inlet if the vehicle is locked before the second predetermined time has lapsed. In other words, if the cable is connected to the power inlet and the vehicle is locked within the second predetermined time after the unlock request is received by the control unit the cable is locked to the power inlet by the lock unit. For example, if a user first requests an unlocking of the cable, and thus charging is aborted, but decides to leave the vehicle and therefore locks the vehicle, the cable is locked to the lock unit and charging may continue without further input from the user.

According to one embodiment of the disclosure, the method may further comprise a step of controlling the lock unit in the power inlet so that a charging cable is prevented from being connected if the vehicle is in an activated mode. A mechanical damage may occur anywhere along the electrical path from the power supply to the energy storage device if the vehicle is moving with the cable connected to the power inlet of the vehicle and to the power supply. An activated mode is a mode where the vehicle may be moved using the power train of the vehicle, powered by either an electrical motor or a combustion engine.

In one embodiment of the disclosure, the method may further comprise a step of detecting if a charging cable is connected to the power inlet by measuring a parameter value of a connector element of the charging cable, wherein if the measured parameter value corresponds to a predetermined value, the cable is locked to the power inlet. Thereby, inappropriate cables are prevented from being connected for charging to the power inlet of the vehicle. By only allowing predetermined cables to be connected safety is improved for a user because only cables known to e.g. being able to handle the high powers and currents may be allowed to be locked to the lock unit in the power inlet, and thus, be used for charging of the energy storage device.

According to one embodiment of the disclosure, the parameter value may advantageously be an electrical resistance value. The value may be obtained by an electrical measurement of the connector element being, for example, a proximity pin located in the power inlet connected to the connector of the cable. The resistance value may for example be compared to a predetermined resistance value known from an industry standard (e.g. 61851-1 IEC:2010).

According to one embodiment of the disclosure, the method may further comprise, if it is detected that a charging cable is connected to the power inlet, locking the charging cable to the power inlet within a third predetermined time after the charging cable has been detected. The safety for a user thus increases since the cable is securely locked to the lock unit before charging of the energy storage device begins. Within the typically short third predetermined time after the cable is detected means before the third predetermined time has lapsed starting from when the detection of the cable at the lock unit by the control unit occurred.

According to an embodiment of the disclosure, the method may further comprise starting charging of the energy storage device if a charging cable is locked to the power inlet. If a cable, which may be connected by a user to the power inlet of the vehicle, is properly detected by the control unit, the connector of the cable is locked to the power inlet by the lock unit and charging may start without further input from a user. Thereby a user is allowed to enter the interior of the vehicle even when the energy storage device of the vehicle is being charged, if the vehicle doors are not locked prior to charging. Moreover, a user may also access e.g. the storage compartment in the vehicle by opening a trunk of the vehicle, also during charging.

According to one embodiment of the disclosure, the method may further comprise a step of aborting charging and unlocking the cable from the power inlet of the vehicle if the vehicle is started while the cable is locked to the power inlet. Thereby, removal of the cable from the power inlet is thus facilitated for a user because the cable is unlocked when the vehicle is started. Furthermore, damages on the vehicle, the cable, or connectors may be avoided in case the vehicle is moved away from a charging station when the cable is connected to a power supply at the charging station.

According to an embodiment of the disclosure, the unlock request for unlocking the charging cable may be different from a request to unlock the vehicle. In other words, a user may send an unlock request for unlocking the charging cable from the power inlet of the vehicle without the having to unlock the vehicle itself.

According to a second aspect of the disclosure there is provided a system for controlling a lock state of a charging cable connected to a power inlet of an electrical vehicle comprising an energy storage device, the system comprising: a control unit; a power inlet electrically connected to the energy storage device and configured to receive the charging cable; a lock unit configured to mechanically lock the charging cable to the power inlet; wherein the control unit is configured to, when an unlock request is received by the control unit: break an electrical connection between the charging cable and the energy storage device such that charging is aborted; unlock the cable from the power inlet within a first predetermined time after receiving the unlock request; and, if the cable is not removed from the power inlet within a second predetermined time after the unlock request is received, the control unit is configured to lock the cable to the power inlet and to form an electrical connection between the power supply and the energy storage device to restart charging.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The system may further comprise additional rectifier bridges and filters, such as high-pass or low-pass filters, or converters required for charging without limiting the scope of the disclosure.

According to one embodiment of the disclosure, the system may further comprise a remote unit for generating the unlock request based on a user input. The remote unit is advantageously a vehicle key, an unlock button located inside or outside the vehicle, or a keyless unit for entry to the vehicle.

According to one embodiment of the disclosure, the system may further comprise a measurement element, arranged in the power inlet and configured to receive a connector element of the charging cable, wherein, if the measurement element is connected to the control unit, the control unit is configured to determine that a charging cable is detected at the power inlet of the vehicle if a parameter value of the connector element measured by the control unit corresponds to a predefined value. The measurement element is an element configured to receive and to contact the connector element of the charging cable such that it enables the control unit to measure the parameter value of the connector element.

According to one embodiment of the disclosure, the parameter value of the connector element is an electrical resistance value.

Effects and features of this second aspect of the present disclosure are largely analogous to those described above in connection with the first aspect of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing embodiments of the disclosure, wherein.

DETAILED DESCRIPTION

As required, detailed embodiments are disclosed herein. However, it is to be understood that the disclosed embodiments are merely exemplary and various and alternative forms are possible. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
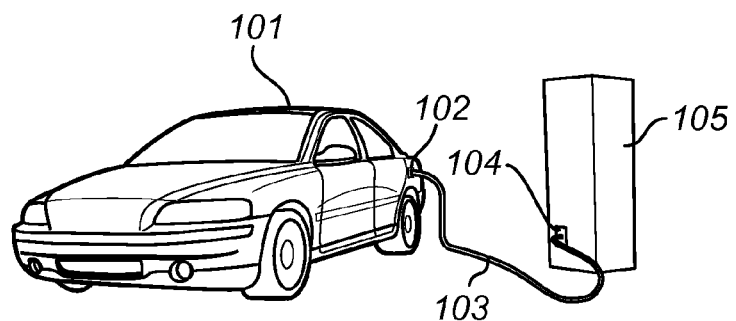
FIG. 1 schematically shows an exemplary application of a system and a method according to an embodiment of the disclosure.

In the following description, the present disclosure is mainly described with reference to a method for securing and locking a charging cable to a hybrid or electric vehicle. In the description the control unit is located in a vehicle. However, the control unit may be located elsewhere, for example in the charging station FIG. 1 illustrates an exemplary application of the present disclosure. In, FIG. 1, an electric vehicle 101 is connected at its power inlet 102 via a charging cable 103 to an external power supply 104. The external power supply 104 may for example be located at a charging station 105 for electric vehicles or it may be connected to a conventional domestic power outlet. The disclosure is independent of the power supply, thus the supplied power may for example be 220 V at 50 Hz or 110 V and 60 Hz via a one-phase output or three-phase output. The charging cable 103 can be a regular power cord that may or may not comprise any further components such as e.g. temperature sensors.

Figure 2:
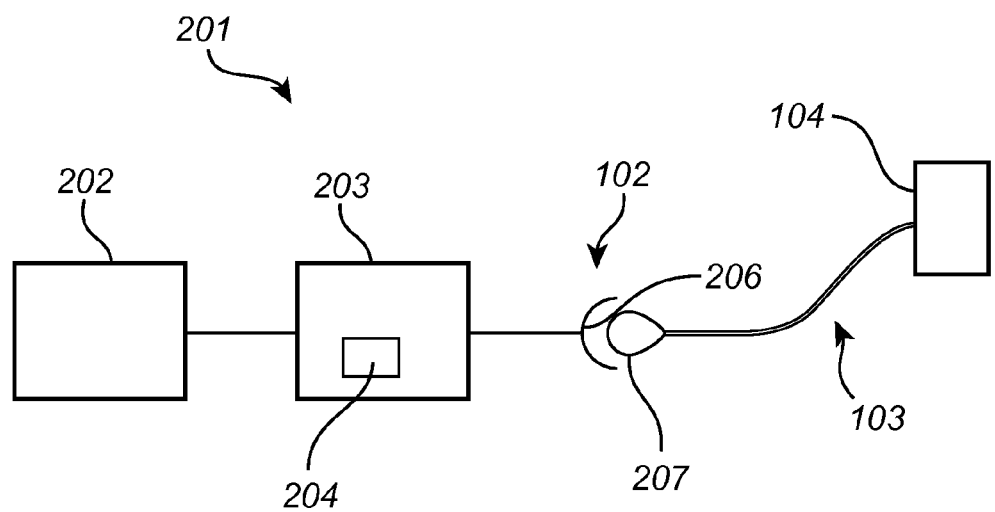
FIG. 2 schematically shows an exemplary embodiment of the system according to the present disclosure.

FIG. 2 schematically illustrates an exemplary embodiment of a system 201 according to the disclosure. FIG. 2 shows an energy storage device in the form of a rechargeable battery 202, an onboard charger 203 comprising a control unit 204, a power inlet 102, a lock unit 206, and a cable 103 having a connector 207. The rechargeable battery 202 and the onboard charger 203 are located in the vehicle. The onboard charger 203 is arranged such that it may draw power from an external power supply 104 via the connector 207 and the power inlet 102 to the battery 202. The inlet 102 has a lock unit 206 that can mechanically lock the connector 207 of the cable 103 to the power inlet 102. The lock unit 206 may be a mechanical, electromagnetic, or any other construction that is suitable for locking the connector 207 to the power inlet 102. Most importantly, the lock unit 206 should prevent the charging cable 103 from being pulled out from the power inlet 102 during charging. The lock unit 206 may further be configured to prevent an unknown object to be inserted into the power inlet 102 when the connector 207 of the cable 103 is not connected to the power inlet 102. The control unit 204 is configured to control the lock unit 206 to lock or unlock the connector 207 to/from the power inlet 102. The control unit 204 is further configured to control the onboard charger 203 to start or abort charging of the battery 202.

Figure 3:
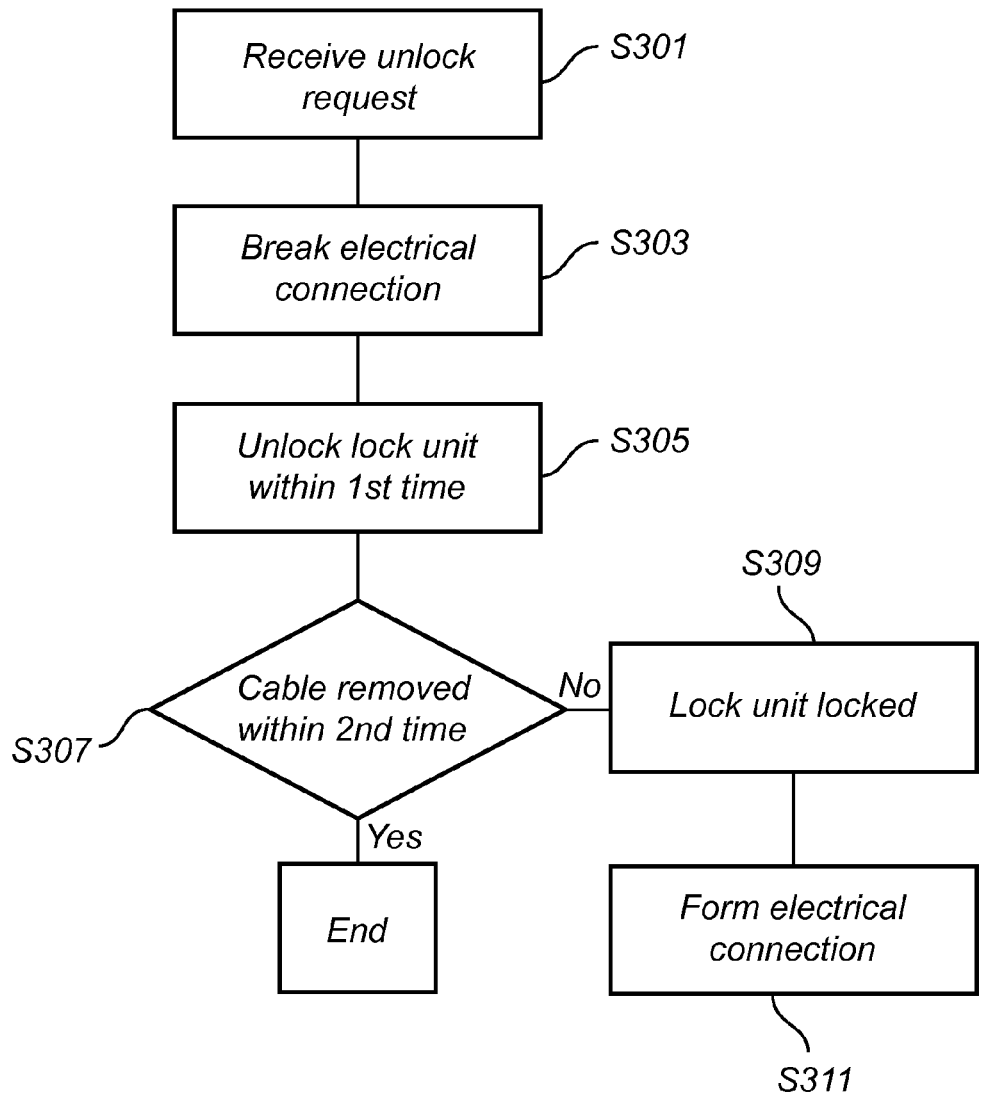
FIG. 3 is a flow-chart illustrating a method according to an exemplary embodiment of the disclosure.

FIG. 3 shows a flow-chart illustrating an exemplary embodiment of a method according to an aspect of the disclosure. In a first step S301, an unlock request is received in the control unit 204. The unlock request is a request for unlocking a charging cable 103 from a power inlet 102 of a vehicle 101. An unlock request may be based on user input and may be received from e.g. vehicle keys, an unlock button located inside or outside the vehicle 101, or a keyless unit for entry to the vehicle 101. Furthermore, the unlock request may be different from a request to unlock the vehicle 101. In other words, a user may send an unlock request for unlocking the charging cable 103 from the power inlet 102 of the vehicle without the having to unlock the vehicle 103 itself. In a subsequent step S303, an electrical connection between the charging cable 103 and the energy storage device 202 is broken such that charging of the energy storage device 202 is aborted. In step S305, the control unit 204 controls the lock unit 206 to unlock the charging cable 103 from the power inlet 102 within a first predetermined time period after the unlock request was received by the control unit 204. However, in step S307 it is determined whether the cable 103 has, within a second predetermined time period, been removed from the power inlet 102. If the cable 103 has not been removed, the lock unit 206 locks the charging cable 103 to the power inlet 102 in step S309, and charging may be restarted after having formed an electrical connection between the charging cable 103 and the energy storage device 202 in step S311. If the cable 103 has been removed, the process is finished.

Figure 4:
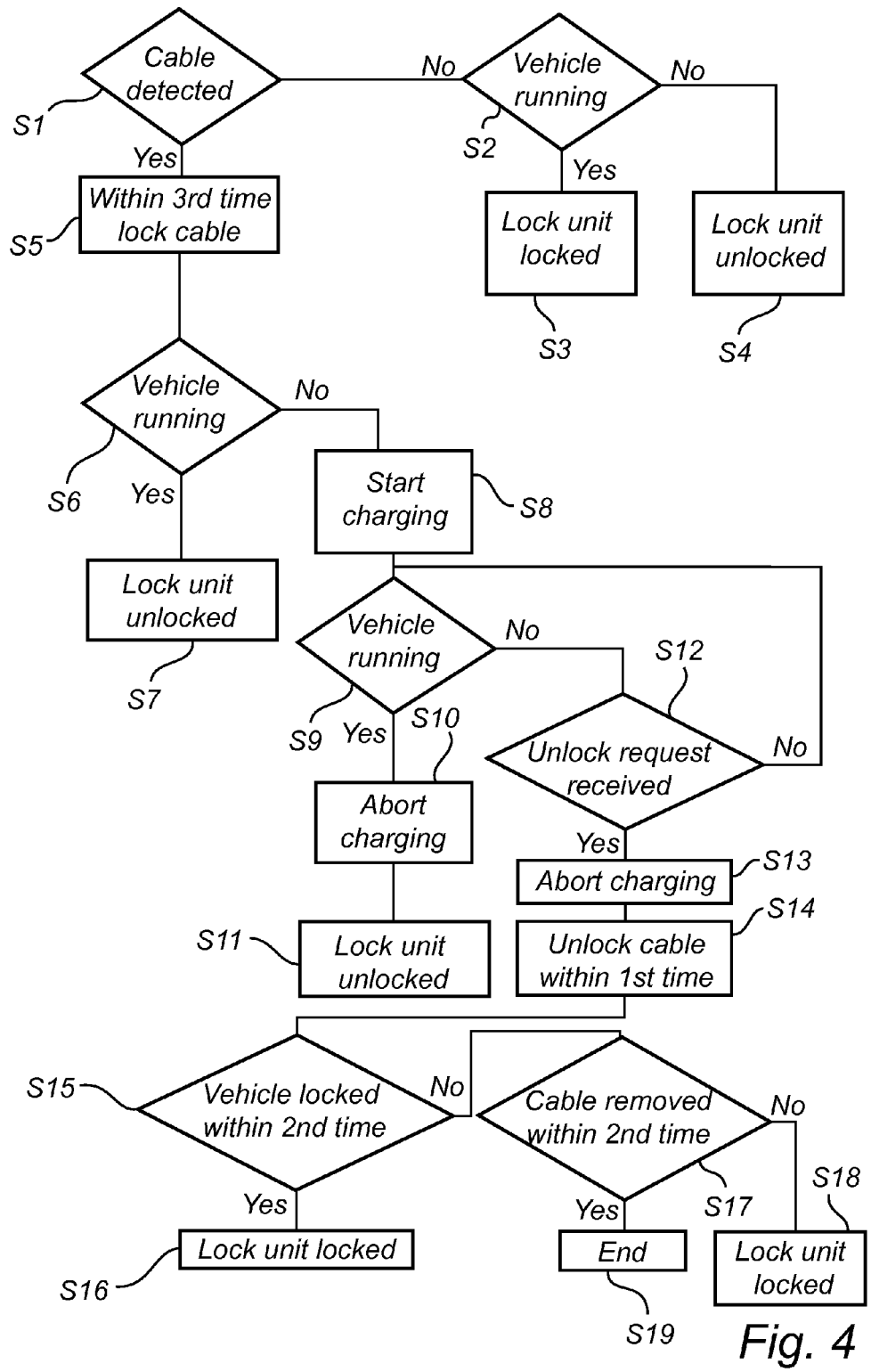
FIG. 4 is a flow-chart illustrating a method according to an exemplary embodiment of the disclosure.

FIG. 4 shows a flow-chart illustrating another exemplary embodiment of a method according to an aspect of the disclosure. In a first step S1, it is determined whether a charging cable 103 has been detected at a power inlet 102 of a vehicle 101. A connector of a charging cable 103 is detected in the power inlet 102 by measuring a parameter value, such as an electrical resistance of a connector element of the charging cable 103. If the measured electrical resistance value corresponds to a predetermined value, the cable 103 is determined to be detected at the power inlet 102. If no cable has been detected and the vehicle is running in step S2, the lock unit is locked in step S3 in order to prevent a connector of a charging cable 103 from being connected to the power inlet 102. By preventing a cable 103 to be connected to a running vehicle a mechanical damage which may occur anywhere along the electrical path from the power supply to the energy storage device 202 may be prevented. Such a mechanical damage may occur if the charging cable 103 is connected to the power supply 104 and to the power inlet 102 of the vehicle 101 while the vehicle 101 is moving. The lock unit 206 may be configured to prevent unknown objects from being inserted in the power inlet 102. If the vehicle is not running in step S2, the lock unit may be unlocked in step S4 if an unlock request is received. If it is determined in step S1 that a charging cable 103 is detected at the power inlet 102, the charging cable 103 is locked to the power inlet 102 by the lock unit within a third predetermined time in step S5. The third predetermined time may be in the order of 1-5 seconds, for example 3 seconds. Subsequently, it is again determined whether the vehicle is running in step S6. If the vehicle is running, the lock unit is unlocked in step S7 so that the cable 103 may be removed. Removing the cable may be advantageous in order to prevent mechanical damage to the cable as described previously. If the vehicle is not running in step S6, a charging sequence may start in step S8. During charging, it is continuously monitored if the vehicle 101 is running or not or a signal may be sent when a start command is received in step S9. If the vehicle 101 is determined to be running, the charging process is aborted S10 and the cable 103 is unlocked S11 from the power inlet 102. If the vehicle is not running in step S9, it is determined in step S12 whether an unlock request has been received. If it is determined that an unlock request has been received, charging is aborted in step S13. An unlock request may be based on a user input. The cable 103 is unlocked from the power inlet 102 of the vehicle 101 by the lock unit 206 in a subsequent step S14 within a first predetermined time period. The first predetermined time period may be in the range of 1-5 seconds, for example 1 second. If the vehicle 101 is locked within a second predetermined time period in subsequent step S15, the second predetermined time period being longer than the first predetermined time period, the lock unit 206 is also locked in S16 and charging may be restarted in step S8. The second predetermined time may be in the range of 30-300 seconds, for example 110 seconds. Moreover, if the vehicle 101 is not locked before the second predetermined time period has elapsed and the cable 103 is not removed from the power inlet 102 within the second predetermined time in step S17, the cable 103 is relocked S18 to the power inlet 102 by the lock unit 206 and charging may be restarted in step S8. However, if the cable 103 has been removed, the process is finished in S19 and the vehicle is ready for use.

Additionally, variations to the disclosed embodiments can be understood and effected by the skilled person in practicing the claimed disclosure, from a study of the drawings, the disclosure, and the appended claims. For example, the present disclosure is equally applicable to a charging system connected to a three-phase power supply. The method may be implemented even if the control unit is located in for example the charging station. Furthermore, similar to an unlock request, a lock request may be sent for locking of a charging cable 103 to a power inlet 102 of a vehicle. Locking of the cable to the power inlet is preferably done within a fourth predetermined time period of 1-5 seconds, such as 1 second, after the lock request is received by the control unit 204.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method for controlling a lock state of a charging cable connected to a power inlet of an electrical vehicle, the vehicle comprising an energy storage device electrically connected to the power inlet, a lock unit for locking the charging cable to the power inlet, and a control unit for controlling a lock state of the lock unit, the method comprising:
   in the control unit, receiving an unlock request for unlocking a charging cable locked to the power inlet by the lock unit;
   breaking an electrical connection between the charging cable and the energy storage device such that charging is aborted;
   unlocking the cable from the power inlet within a first predetermined time after receiving the unlock request; and,
   if the cable is not removed from the power inlet within a second predetermined time after receiving the unlock request, locking the cable to the power inlet and forming an electrical connection between the charging cable and the energy storage device to restart charging.

2. The method according to claim 1 further comprising locking the cable to the power inlet if the vehicle is locked before the second predetermined time has lapsed.

3. The method according to claim 1 further comprising controlling the lock unit in the power inlet so that a charging cable is prevented from being connected if the vehicle is in an activated mode.

4. The method according to claim 1 further comprising detecting if a charging cable is connected to the power inlet by measuring a parameter value of a connector element of the charging cable, wherein if the measured parameter value corresponds to a predetermined value, the cable is locked to the power inlet.

5. The method according to claim 4 wherein the measured parameter value is an electrical resistance.

6. The method according to claim 4 further comprising, if it is detected that a charging cable is connected to the power inlet, locking the charging cable to the power inlet within a third predetermined time after the charging cable has been detected.

7. The method according to claim 6 further comprising starting charging of the energy storage device if a charging cable is locked to the power inlet.

8. The method according to claim 1 further comprising aborting charging and unlocking the cable from the power inlet if the vehicle is started while the cable is locked to the power inlet.

9. The method according to claim 1 wherein the unlock request for unlocking the charging cable is different from a request to unlock the vehicle.

10. A system for controlling a lock state of a charging cable connectable to a power inlet of an electrical vehicle comprising an energy storage device, the system comprising:
a control unit;
a power inlet electrically connected to the energy storage device and configured to receive the charging cable;
a lock unit configured to mechanically lock the charging cable to the power inlet;
wherein the control unit is configured to, when the charging cable is locked to the power inlet by the lock unit and an unlock request is received by the control unit:
break an electrical connection between the charging cable and the energy storage device such that charging is aborted;
unlock the cable from the power inlet within a first predetermined time after receiving the unlock request; and
if the cable is not removed from the power inlet within a second predetermined time after the unlock request is received, the control unit is configured to lock the cable to the power inlet and to form an electrical connection between the power supply and the energy storage device to restart charging.

11. The system according to claim 10 further comprising a remote unit for generating the unlock request based on a user input.

12. The system according to claim 11 wherein the remote unit is a vehicle key, an unlock button located inside or outside the vehicle, or a keyless unit for entry to the vehicle.

13. The system according to claim 10 further comprising a measurement element arranged in the power inlet and configured to receive a connector element of the charging cable wherein, if the measurement element is connected to the control unit, the control unit is configured to determine that a charging cable is detected at the power inlet of the vehicle if a parameter value of the connector element measured by the control unit corresponds to a predefined value.

14. The system according to claim 13 wherein the parameter value of the connector element is an electrical resistance value.

15. The system according to claim 10 wherein the control unit is configured to abort charging and unlocking the cable from the power inlet if the vehicle is started while the cable is locked to the power inlet.

16. A system for controlling a lock state of a charging cable connectable to a power inlet of an electric vehicle, the power inlet electrically connected to an energy storage device and configured to receive the charging cable, the system comprising:
a control unit;
a lock unit configured to mechanically lock the charging cable to the power inlet;
wherein the control unit is configured to, when the charging cable is connected to the power inlet and an unlock request is received by the control unit:
break an electrical connection between the charging cable and the energy storage device such that charging is aborted;
unlock the cable from the power inlet within a first predetermined time after receiving the unlock request; and
if the cable is not removed from the power inlet within a second predetermined time after the unlock request is received, lock the cable to the power inlet and form an electrical connection between the power supply and the energy storage device to restart charging.

17. The system according to claim 16 further comprising a remote unit for generating the unlock request based on a user input.

18. The system according to claim 16 further comprising a measurement element arranged in the power inlet and configured to receive a connector element of the charging cable wherein, if the measurement element is connected to the control unit, the control unit is configured to determine that a charging cable is detected at the power inlet of the vehicle if a parameter value of the connector element measured by the control unit corresponds to a predefined value.

19. The system according to claim 18 wherein the parameter value of the connector element is an electrical resistance value.

20. The system according to claim 16 wherein the control unit is configured to abort charging and unlocking the cable from the power inlet if the vehicle is started while the cable is locked to the power inlet.

* * * * *